United States Patent [19]

Takai

[11] Patent Number: 4,563,711
[45] Date of Patent: Jan. 7, 1986

[54] TAPE PLAYER

[75] Inventor: Kazuki Takai, Tokyo, Japan

[73] Assignee: Clarion Co., Ltd., Tokyo, Japan

[21] Appl. No.: 559,403

[22] Filed: Dec. 8, 1983

[30] Foreign Application Priority Data

Dec. 9, 1982 [JP] Japan ................................. 57-214684
Dec. 14, 1982 [JP] Japan ................................. 57-217779

[51] Int. Cl.⁴ ............................................. G11B 15/44
[52] U.S. Cl. .................................. 360/74.1; 242/204; 242/208
[58] Field of Search ................ 360/74.1, 90, 105, 137; 242/204, 208

[56] References Cited

U.S. PATENT DOCUMENTS 4,227,223 10/1980 Magata et al. ..................... 360/73
4,419,702 12/1983 Tanaka ............................... 360/964
4,452,409  6/1984 Takai .................................. 242/204

Primary Examiner—George G. Stellar
Attorney, Agent, or Firm—Russell E. Hattis

[57] ABSTRACT

The tape player includes a control plate movable in response to insertion of a fast-forwarding or rewinding operation lever, an idler gear plate carrying a play mode idler gear, a changeover lever carrying a fast-forwarding and rewinding mode lever, and an interlock means interlocking the idler gear plate with the changeover lever and responsive to movement of the control plate to keep only one of the idler gear plate and the changeover lever at a neutral position where the associated idler gear is away from reel bases.

5 Claims, 10 Drawing Figures

TAPE PLAYER

FIELD OF THE INVENTION

This invention relates to a tape player, and more particularly to a construction wherein a changeover operation from a play mode idler gear to a fast-forwarding and rewinding mode idler gear to call the fast-forwarding or rewinding mode is effected in response to actuation of a control plate and wherein non-braked state of the reel bases is reliably maintained throughout the play, fast-forwarding or rewinding mode.

BACKGROUND OF THE INVENTION

Tape players, in general, include a fast-forwarding (FF) and rewinding (REW) mechanism to transport a tape at a high speed to skip over to a desired music program or to repeatedly listen to a music program.

Figure 1:
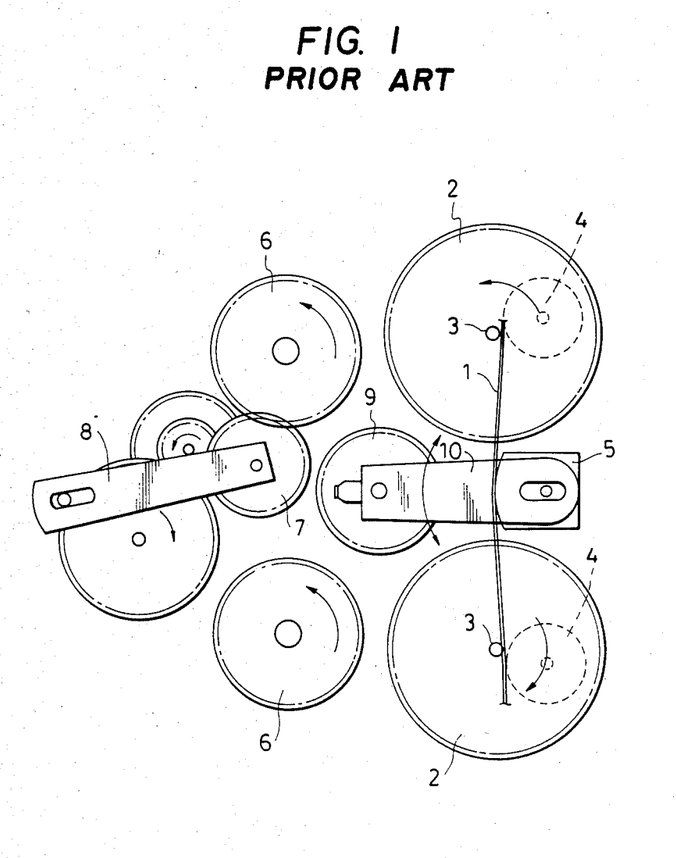
FIG. 1 is a plan view illustrating a fast-forwarding and rewinding mechanism in a prior art tape player, the figure showing the play mode.
Figure 2:
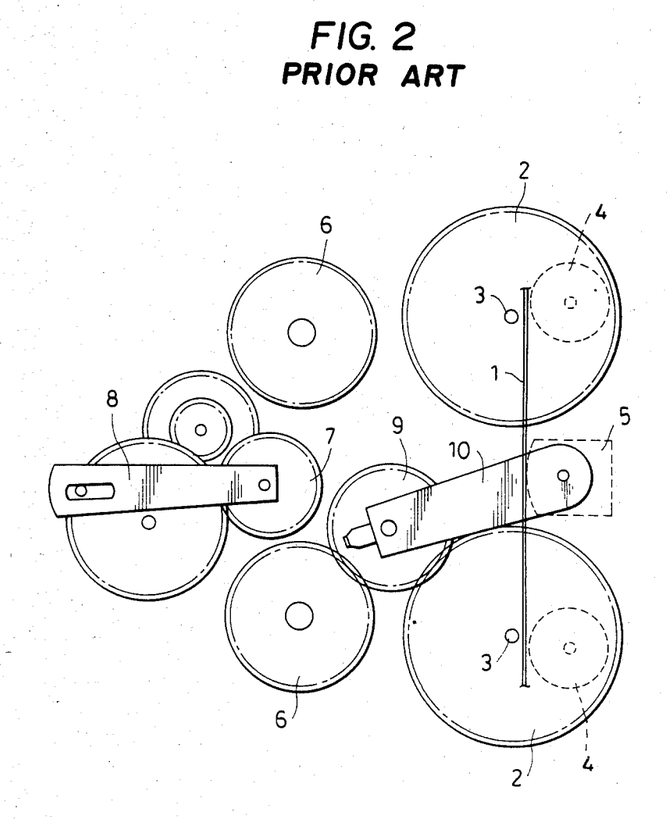
FIG. 2 is a plan view of the mechanism shown in FIG. 1 but illustrating the rewinding mode.

FIGS. 1 and 2 show such a FF/REW mechanism. When the tape player is in the play mode as shown in FIG. 1, a tape 1 forcibly contacts with capstans 3 fixed on forward and reverse flywheels 2 due to pressure of pinch rollers 4 and with a head 5 displaced to its fully advanced position. Forward and reverse drive reel bases 6 are aligned parallely with the flywheels 2 and a play mode idler gear 7 is interposed between the reel bases 6 to transmit a motor power to a selected one of the reel bases 6. The selective engagement of the play mode idler gear 7 with the reel bases 6 is effected by rotating an idler gear plate 8 carrying the play mode idler gear 7 thereon. A fast-forwarding and rewinding mode idler gear 9 is interposed between the two flywheels 2 to transmit the flywheel (motor) rotation to the reel bases 6. In this play mode, however, the fast-forwarding and rewinding idler gear 9 is kept at a neutral (decoupled) position by a changeover lever 10.

To create the fast-forwarding or rewinding mode, a corresponding operation lever not shown is pushed by hand to rotate the changeover lever 10 to the forward mode flywheel and reel base or to the reverse mode ones so that the fast-forwarding and rewinding mode idler gear 9 engages a selected couple of the flywheel 2 and the reel base 6. Concurrently, due to the advancing force of the operating lever, motor power and spring force stored thereby, a control plate such as head plate, pinch roller plate or other plate retires to a position wherein the head 5 slightly contacts the tape and the pinch rollers 4 are away from the capstans 3, and the idler plate 8 is in its neutral position, in response to the withdrawal of the control plate, so that the play mode idler gear 7 disengages from the reel base 6.

The prior art mechanism, however, often produces a time lag between the detachment of the play mode idler gear 7 from the reel base 6 and the engagement of the fast-forwarding and rewinding mode idler gear 9 with the flywheel 2. The time lag is caused by the following reason.

The connection of the fast-forwarding and rewinding mode idler gear 9 to the flywheel 2 is immediately effected by the displacement of the changeover lever 10 which is concurrent with insertion of a manually operated fast-forwarding or rewinding operation lever. However, the detachment of the play mode idler gear 7 from the reel base is not effected immediately. For example, if the tape player is designed to keep the control plate at a position by an energized plunger against a spring force and to detach the play mode idler gear 7 from the reel base 6 by withdrawing a plunger plate upon deenergization of the plunger in response to insertion of the operating lever, the detachment is not effected before a deenergization switch is actually operated. If the tape player is designed to detach the idler gear 7 by withdrawing the control plate with the motor power transmitted thereto in response to insertion of the operating lever, the detachment is not effected before the motor power is actually transmitted to the control plate.

Because of the reasons, it sometimes occurrs that both the play mode idler gear 7 and the fast-forwarding and rewinding mode idler gear 9 concurrently engage the reel base 6, thereby causing a lock or damages of the idler gears and applying an excessive load to the motor.

Further, a new type of tape player is designed to save the operating power to create the fast-forwarding or rewinding mode, by using the motor power to shift the head to or away from the tape and to shift the pinch rollers to or away from the capstans.

In this type of tape player, it takes a time from cancellation of the fast-forwarding or rewinding mode to actual engagement of the play mode idler gear with the reel base. Therefore, the reel base overruns due to the inertia given by the former high revolution and causes that a soundless zone of the tape detected by a music selecting operation passes far over the head and that the beginning of a desired music is skipped over.

To prevent this phenomenun, it is proposed to provide the reel bases with braking means so that even when the tape uses a motor power to shift the pinch rollers, the reel bases are immediately stopped upon cancellation of the fast-forwarding or rewinding mode and commence the low revolution for the play mode.

As such braking means, there are conventionally proposed the following formats:

(1) braking members which normally maintain their non-braking state are biased to braking positions at the beginning of the cancelling operation of the fast-forwarding or rewinding operation lever and return to the normal non-braking positions when the cancelling operation of the lever is completed;

(2) braking members which normally maintain the non-braking state are biased to braking positions by movement of the high revolution idler gear or of a changeover lever therefor at the beginning of the movement of the high revolution idler gear away from the reel base, and return to the normal non-braking positions when the low revolution idler gear engages the reel base; and (3) upon the replacement from the state of (2) above to the normal play mode, the braking members move toward the non-braking positions while the low revolution idler gear still moves to the reel base and just before they engage, and stay at the normal non-braking positions when the play is started.

With the braking mechanism, however, wherein the braking operation is controlled by a single member such as the fast-forwarding or rewinding operation lever, idler gear, or others, the time when the braking mechanism actually operates is not constant due to the positions and the operating time lags of the control members, thereby leading to a phenomenun that the braking members which should maintain the non-braking state unexpectedly brake the reel bases when the tape play is started.

Further, the braking mechanism is not regulated by any control member during the play mode. So, particularly when the player is assembled in a car, a force similar to the lever cancelling operation is sometimes applied to the braking mechanism upon a sudden and strong impact to the car, thereby unexpectedly actuating the braking members to stop the reel bases during the play mode.

If the tape player is designed to use the motor power to shift various members, it takes a time to return to the normal play mode after starting the cancelling operation of the fast-forwarding or rewinding operation lever, and the reel bases are left free during the time (after the braking members brake the reel bases at the beginning of the cancelling operation of the fast-forwarding or rewinding operation lever and thereafter return to the non-braking positions and before the low revolution idler gear engages the reel base), thereby causing looseness or damage of the tape.

OBJECT OF THE INVENTION

It is therefore an object of the invention to provide a tape player which never causes that both the play mode idler gear and the fast-forwarding and rewinding mode idler gear simultaneously engage the reel base.

A further object of the invention is to provide a tape player using the motor power to shift the head which reliably keeps the braking mechanism inoperative during the play, fast-forwarding or rewinding mode and never leave the reel bases uncontrolled after cancellation of the fast-forwarding or rewinding mode and before revival of the play mode.

SUMMARY OF THE INVENTION

In the tape player according to the invention, both an idler plate carrying a play mode idler gear and a changeover lever carrying a fast-forwarding (FF) and rewinding (REW) mode idler gear are interlocked with a control lever movable in response to insertion of an FF operation lever or a REW operation lever so that according to the position of the control plate, only one of the idler gears engages the reel base and the other is kept in a neutral position.

Further, the tape player is designed to control braking members by both the FF or REW operation lever and the control plate. In particular, a brake control plate is employed to release the braking state when the FF or REW operation lever is actuated, whereas cams are formed on the control plate to release the braking state when the control plate is in a fully advanced position. Thereby, the non-braking state is maintained throughout the play, fast-forwarding and rewinding mode, whereas the braking state is fully maintained from the cancellation of the FF or REW mode to the revival of the play mode, using a difference between the time for the FF or REW operation lever to return to the non-actuated position and the time for the control plate to reach the play position. Thus, the reel bases are never left free.

In order that the present invention may be clearly understood and readily carried into effect, embodiments thereof will now be described, by way of example only, with reference to the accompanying drawings.

BRIEF DESCRIPTION OF THE DRAWINGS

FIG. 10 is a plan view of the braking mechanism shown in FIG. 5, illustrating the operation lever and the braking members at the time when the operation lever is pushed in.

DETAILED DESCRIPTION OF THE PREFERRED EMBODIMENTS

First, a fast-forwarding and rewinding mechanism in a tape player embodying the present invention will be described with reference to FIGS. 3 and 4. In this embodiment, a control plate 20 comprises a so-called pinch roller plate carrying thereon pinch rollers and conveying them to and away from capstans, and an independently provided head plate not shown carries thereon a head and conveys it to and away from the tape. Further, the control plate 20 is moved to an advanced position (to the left in the Figure) by a motor power and is withdrawn (to the right in the Figure) by springs which store energy during the advancement of the control plate and are released from a restriction of an electromagnetic plunger then deenergized. These mechanisms are not explained in detail in this text because they are a known technique.

The control plate 20 has a cam hole at a portion between reel bases 6. The cam hole includes a recess 21a and a funnel-shaped portion 21b gradually symmetrically expanding from the recess 21a. The control plate is also provided with a projection 22 projecting from the center between two flywheels 2 toward the reel bases 6. The projection 22 has at the tip thereof a pin 23 extending downward (to the back of the sheet).

Under the control plate 20, an idler plate 24 carrying a play mode idler gear 7 is pivotally supported by an axle 25. The idler plate 24 has a pin 26 projecting upward from the surface thereof (upper surface) opposite to the idler gear mounting surface. The pin 26 engages the cam hole 21 of the control plate 20. A changeover lever 27 is pivotally supported by the axle 25 under the control plate 20 together with the idler plate 24. The changeover lever 27 has a cam hole 28 receiving the pin 23 of the control plate 20 and including a recess 28a nearer to the reel bases 6 and a funnel-shaped portion 28b gradually and symmetrically expanding from the recess 28a.

Figure 3:
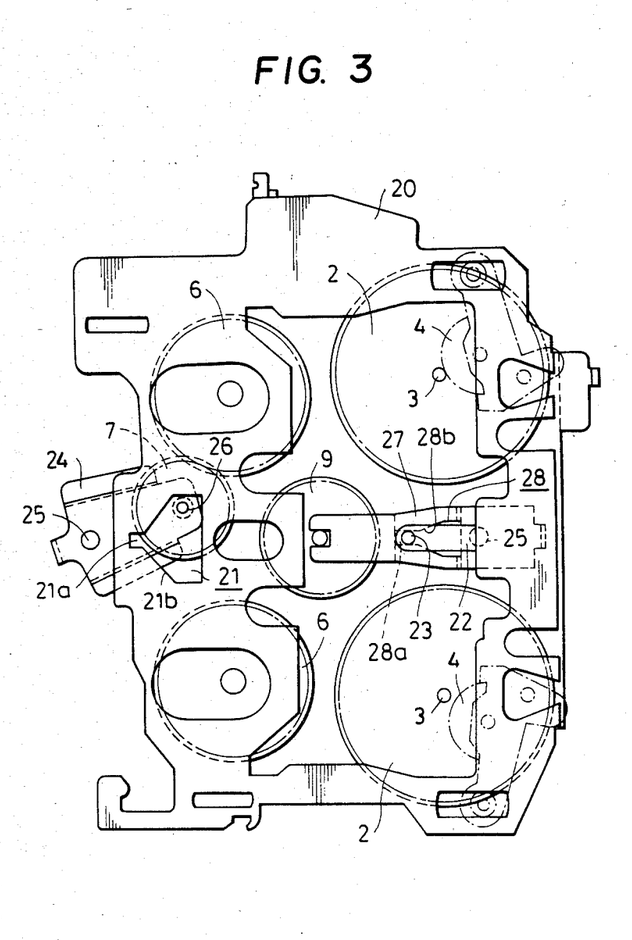
FIG. 3 is a plan view illustrating a fast-forwarding and rewinding mechanism in a tape player embodying the invention, the FIG. showing the play mode.
Figure 4:
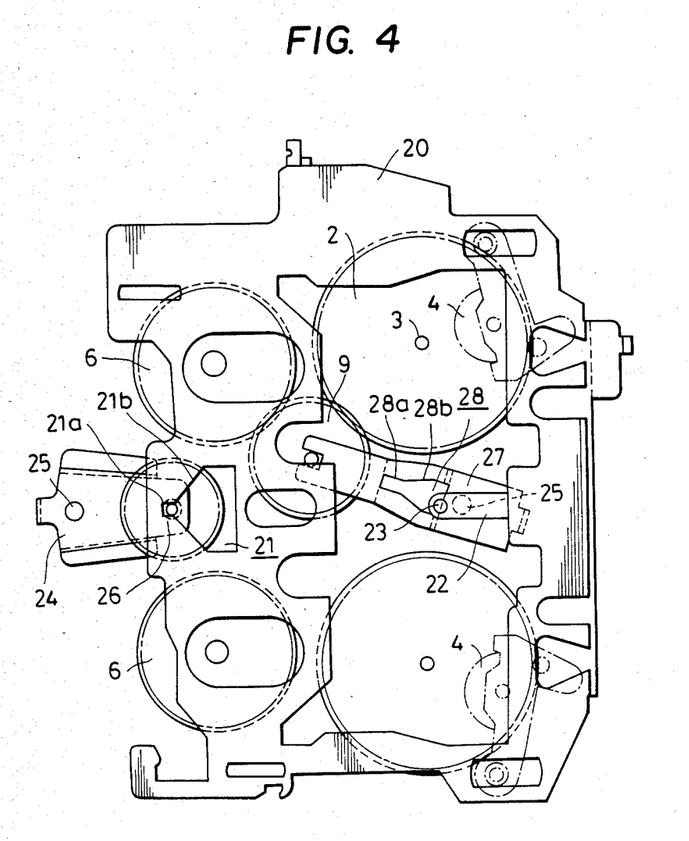
FIG. 4 is a plan view of the mechanism shown in FIG. 3, illustrating the fast-forwarding mode.

With this arrangement, when the tape player is in the play mode as shown in FIG. 3, the control plate 20 is in the fully advanced position whereat the pinch rollers forcibly contact the capstans, thereby placing the pin 26 of the idler plate 24 in the funnel-like portion 21b of the cam hole 21 movably to the width extent thereof so that the play mode idler gear 7 engages the forward drive reel base or the reverse drive reel base 6. On the other hand, the pin 23 of the control plate 20 is placed in the narrow recess 28a of the cam hole 28 and cannot move upward nor downward in the Figure. So, a fast-forwarding or rewinding (FF/REW) mode idler gear which is position controlled by the changeover lever 27 is kept in a neutral position away from the both reel bases 6.

To create the fast-forwarding or rewinding mode, a fast-forwarding operation lever or a rewinding operation lever is manually pushed in to withdraw the control plate 20 by the energy stored in the springs during the advancement of the control plate 20. As the result of the withdrawal, the pin 26 of the idler plate 24 engages the narrow recess 21a of the cam hole 21, and the play mode idler gear 7 is decoupled from the reel base 6 and is displaced to a neutral position.

The withdrawal of the control plate 20 also causes the pin 23 of the control plate 20 to position in the wider funnel-shaped portion 28b of the cam hole 28, thereby rendering the changeover plate 27 freely rotatable so that the FF/REW mode idler gear 9 engages one of the flywheels 2.

The engagement between the control plate 20 and the idler plate 24 by the cam hole 21 and the pin 26 may be modified into a combination of a cam hole formed in the idler plate 24 and a pin formed on the lower surface of the control plate 20. In this case, the cam hole should be symmetrical to the cam hole 21 illustrated. Similarly, the engagement between the control plate 20 and the changeover plate 27 by the pin 23 and the cam hole 28 may be replaced by a combination of a cam hole formed in the control plate 20 and a pin formed on the upper surface of the changeover plate 27. In this case also, the cam hole should be symmetrical to the cam hole 28 illustrated.

Although the aforegoing description states that the advancement of the control plate 20 is effected by the motor power, the control plate 20 may be fully controlled manually or by spring force. The control plate 20 may be a so-called head plate carrying a head thereon or a plate carrying both a head and pinch rollers thereon and serving as both a head plate and a pinch roller plate.

Next, a braking mechanism in a tape player embodying the invention is described hereunder with reference to FIGS. 5 to 10.

Figure 5:
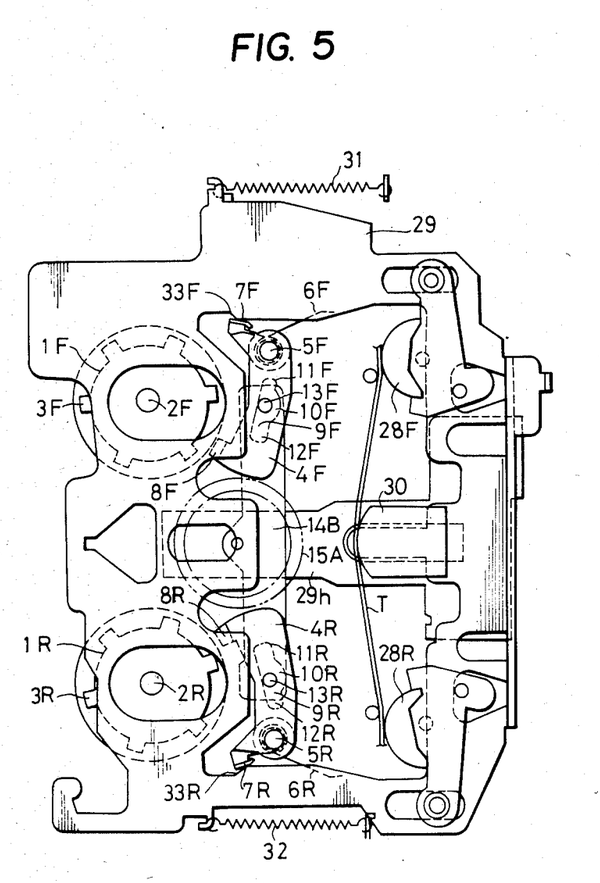
FIG. 5 is a plan view of a braking mechanism in the tape player embodying the invention, the Figure showing the play mode.

A forward-drive reel base 1F and a reverse drive reel base 1R are pivotally supported by axles 2F and 2R. The reel bases 1F and 1R are formed with plural projections 3F and 3R radially extending from the circumferences thereof for engagement with braking members which will be described later.

Two braking members 4F and 4R are mounted beside the reel bases 1F and 1R, respectively. The braking members 4F and 4R each have an elongated aspect with the both ends projecting toward the reel bases. The braking members 4F and 4R are pivotally supported at the corners thereof remote from each other on the base plate of the tape player by axles 5F and 5R. One ends of the braking members 4F and 4R nearer to the axles 5F and 5R, respectively, are linked to springs 6F and 6R biasing the braking member 4F in the clockwise direction and the braking member 4R in the counterclockwise direction in the rest or eject mode of the tape player. Said one ends of the braking members nearer to the axles 5F and 5R have pressure-receiving portions 7F and 7R projecting from the tips thereof toward the reel bases for receiving pressure by tapered cams of a control plate which will be described later.

The other ends of the braking members 4F and 4R remote from the axles 5F and 5R include engagement means 8F and 8R engageable with the projections 3 of the associated reel bases 1F and 1R, respectively.

The individual braking members 4F and 4R are formed with elongated holes 9F and 9R. Each elongated hole 9F (9R) consists of a cavity 10F (10R) and tapered cams 11F (11R) and 12F (12R) at both sides of the cavity 10F (10R). The elongated holes 9F and 9R receive therein push pins 13F and 13R to push and rotate the braking members 4F and 4R, respectively.

The push pins 13F and 13R are fixed to a brake control plate 14B which is mounted under the braking members 4F and 4R as if bridging them. The brake control plate 14B carries at the center thereof a high revolution idler gear 15A and rotates to the forward drive reel base 1F or to the reverse drive reel base 1R in response to insertion of a fast-forwarding (FF) operation lever 17F or a rewinding (REW) operation lever 16R (FIG. 10).

Figure 9:
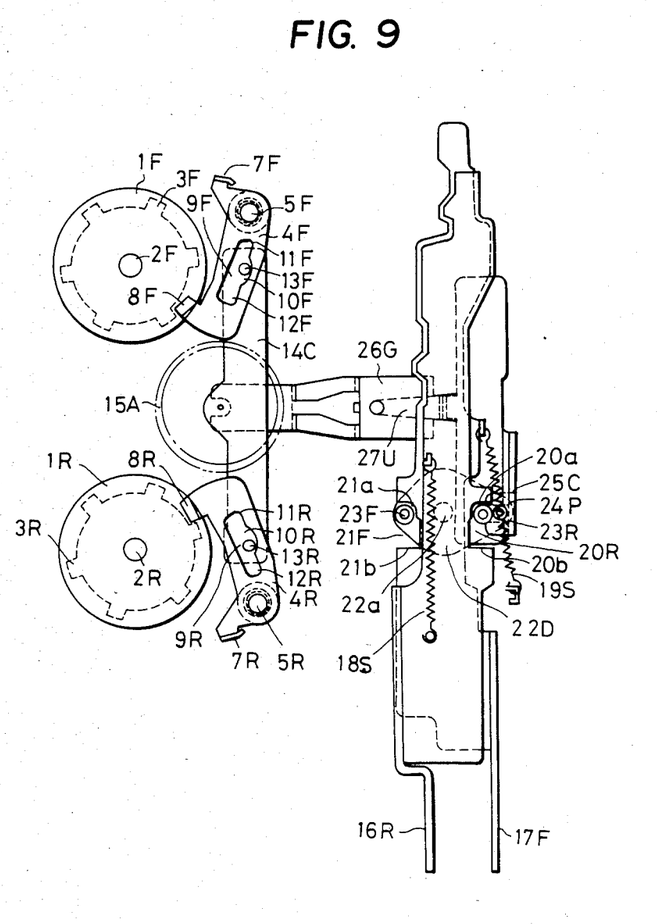
FIG. 9 is a plan view of the braking mechanism shown in FIG. 5, illustrating a fast-forwarding or rewinding operation lever and braking members at the time when the operation lever is released.
Figure 10:
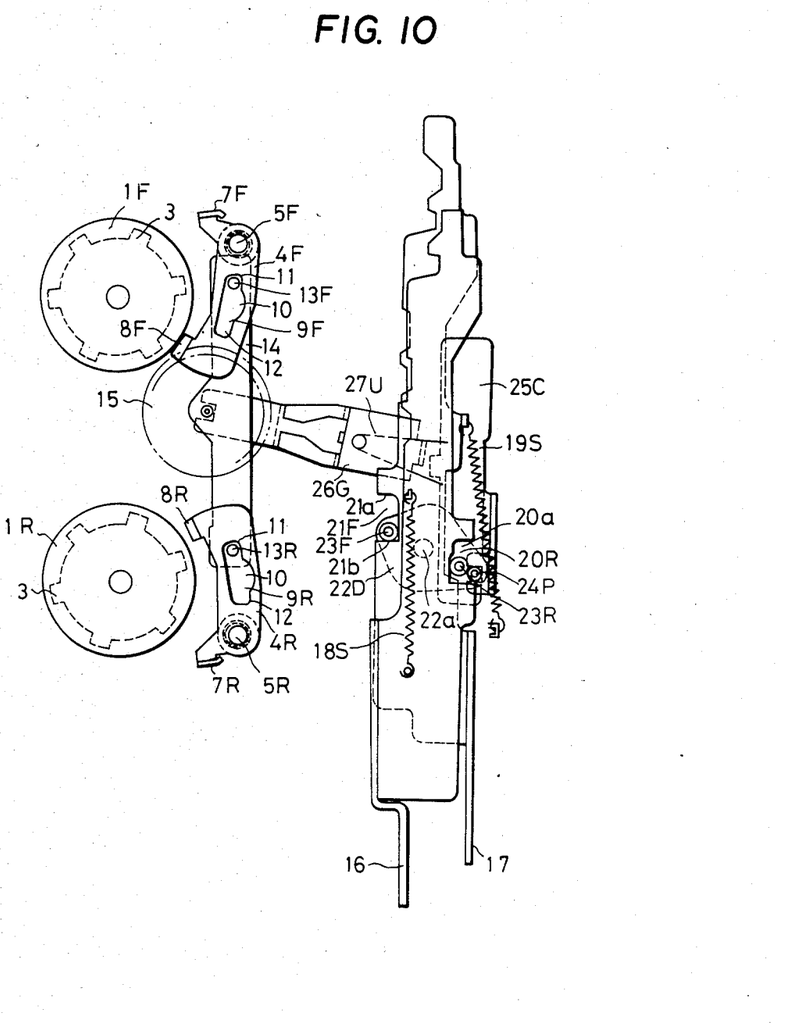

As shown in FIGS. 9 and 10, the REW operation lever 16R and the FF operation lever 17F are each a plate member extending from front to rear of the tape player and are biased by springs 18S and 19S so that they return to their original positions (forward of the tape player) when the fast-forwarding or rewinding mode is cancelled. Each operation lever 16R (17F) is formed with a cut-out 20R (21F) at a central portion thereof. In each cut-out 20R (21F) and at a rear end portion thereof is formed a step 20a (21A). The front edge of the cut-out 20R (20F) serves as a pushing edge 20b (21b) for pushing a pin which will be described later. The operation lever 16R (17F) is partly cut off back to back with the cut-out 20R (21F) so as not to prevent a movement of the pin.

Still in FIGS. 9 and 10, an oval link 22D is mounted under the operation levers 16R and 17F. The above-introduced pins to be pushed by the pushing edges 20b and 21b are designated by 23R and 23F, respectively, and are fixed at the both ends of the oval link 22D. The oval link 22D is pivotally supported at the center thereof by an axle 22a so as to rotate when the pin 23R or 23F is pushed by the pushing edges 20b or 21b. The oval link 22D has a pin 23P extending downward and is thereby connected to an interlock plate 25C. The interlock plate 25C extends from front to rear of the tape player and is mounted on a base plate of the tape player movably in the longitudinal direction in the Figures in response to insertion of the operation lever 16R or 17F.

An idler gear plate 26G extends from the left hand of the interlock plate 25C toward the reel bases 1F and 1R and is pivotally mounted on the base plate. The idler gear plate 26G carries the high revolution idler gear 15A at the end thereof nearer to the reel bases and is connected at the other end thereof to the interlock plate 25C by a U-shaped spring 27U. The spring 27U maintains a flexible connection between the diler gear plate 26G and the interlock plate 25C so as not to convey a possible overrun of the operation lever 16R or 17F and of the interlock plate 25C exceeding a suitable stroke for engagement of the high revolution idler gear 15A with the reel base 1F or 1R.

A forward drive pinch roller 28F and a reverse drive pinch roller 28R are rotatably supported by support members pivotally mounted on the base plate and engage a control plate 29, respectively. The control plate 29 is movable transversely in the Figures so as to detach the pinch rollers normally biased to capstans by springs not shown, away from the capstans when the control plate 29 retires (to the right in the Figures). To this end, the control plate 29 is biased to the right by springs 31 and 32. The control plate 29 is moved to the left by a motor driven head shift mechanism not shown and is interlocked with a head plate 29h carrying thereon a head 30 so as to shift a head to a position for forcible contact with a tape T.

The control plate 29 is formed with a pair of tapered cams 33F and 33R near the reel bases 1F and 1R, respectively, for pushing the pressure receiving protions 7F and 7R of the braking members 4F and 4R in the play mode.

Referring to FIGS. 5 and 9, how the mechanism functions in the play mode is explained hereunder. Since the both operation levers 16R and 17F are pulled by the springs 18S and 19S to the non-operated positions, the both steps 20a and 21a in the cuts-out 20R and 21F push the pins 23R and 23F forward. Therefore, the oval link 22D is maintained at a neutral angular position, and the interlock plate 25C connected to the oval link D via the pin 24P does not move forward nor rearward. The idler gear plate 26G linked to the interlock plate 25C is maintained at a neutral position where the high revolution gear 15A does not engage any of the reel bases. The brake control plate 14B disposed for concurrent movement with the high revolution idler gear 15A is also maintained at a neutral position where the push pins 13F and 13R fixed to the brake control plate 14B enter in the cavities 10F and 10R of the elongated holes 9F and 9R and do not push the tapered cams 11R, 11F, 12R and 12F at both sides of the cavities 10F and 10R. In this state, rotations of the braking members 4F and 4R to the reel bases 1F and 1R due to biasing forces of the springs 6F and 6R are not prevented by the brake control plate 14B.

In the play mode, however, in spite of said tendency of the braking members 4F and 4R, non-braking positions are maintained by the control plate 29 as will be explained hereunder.

In the play mode, the control plate 29 is driven by a motor power for the head shift mechanism and is disposed at the position where the pinch rollers 28F and 28R forcibly contact the capstans. Accordingly, both the tapered cams 33F and 33R of the control plate 29 are positioned in the left wherein they push the pressure receiving portions 7F and 7R of the braking members 4F and 4R and rotate the braking members 4F and 4R in the counterclockwise direction and in the clockwise direction in the Figures against the springs 6F and 6R, respectively, to keep the engagement members 8F and 8R away from the reel bases and maintain the non-braking state.

Figure 6:
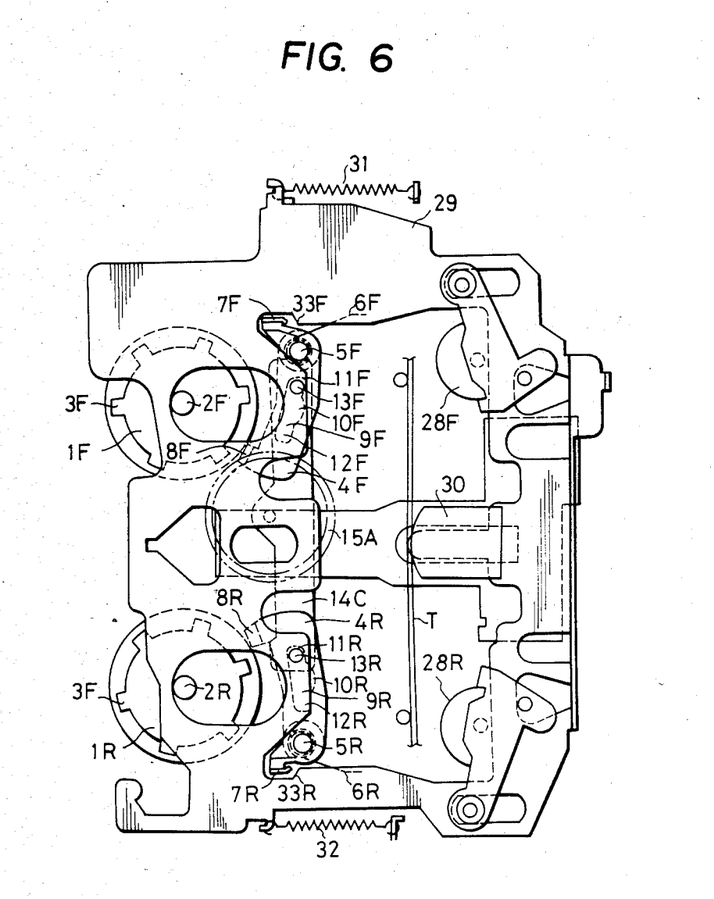
FIG. 6 is a plan view of the braking mechanism shown in FIG. 5, illustrating the fast-forwarding or rewinding mode.

Referring now to FIGS. 6 and 10, how the mechanism functions in the fast-forwarding or rewinding mode is explained hereunder.

Here, the fast-forwarding (FF) lever 17F is pushed in. Since the pressing edge 21b of the cut-out 21F pushes the pin 23F of the oval link 22D, the oval link 22D rotates in the clockwise direction and shifts the interlock plate 25C forward via the pin 24P. Responsively, the idler gear plate 26G carrying the high revolution idler gear 15A rotates in the clockwise direction to engage the idler gear 15A with the forward drive reel base 1F. The brake control plate 14B disposed for concurrent movement with the idler gear 15A moves to a rear position where the push pins 13F and 13R fixed to the brake control plate 14C are positioned at and push the tapered cams 11F and 11R so as to rotate the braking members 4F and 4R against the biasing forces of the springs 6F and 6R.

Assume now that the rewinding lever 16R is pushed in. Since the pressing edge 20b pushes the pin 23R and rotates the oval link 22D in the counterclockwise direction. Then, the members to be sequentially actuated move and rotate in the opposite directions with respect to the fast-forwarding mode, including the brake control plate 14B moving forward. So, the push pins 13F and 13R push the tapered cams 12F and 12R and rotate the braking members 4F and 4R so as to withdraw the engagement members 8F and 8R from the reel bases as in the fast-forwarding mode. Thus, in the fast-forwarding or rewinding mode when the FF operation lever 17F or the REW operation lever 16R is in the inserted position, the engagement members 8F and 8R of the braking members 4F and 4R are kept away from the reel bases 1F and 1R in the non-braking positions.

If the FF operation lever 17F or the REW operation lever 16R is pushed in, an electromagnetic plunger not shown for biasing the control plate 29 to the left against the springs 31 and 32 is deenergized, thereby allowing the springs 31 and 32 to withdraw the control plate 29 to the position where the pinch rollers 28F and 28R are away from the capstans. At the same time, the head plate 29h interlocking with the control plate 29 retreats to the position where the head 30 slightly contacts the tape T. Along with the withdrawal of the control plate 29, the tapered cams 33F and 33R thereof are also displaced to the right and cannot push the braking members 4F and 4R against the spring forces 6F and 6R. In the fast-forwarding or rewinding mode, however, the brake control plate 14B pulls the braking members in the non-braking directions and does not allow the springs 6F and 6R to rotate the braking members 4F and 4R to the positions where the engagement members 8F and 8R engage and brake the reel bases 1F and 1R.

Figure 7:
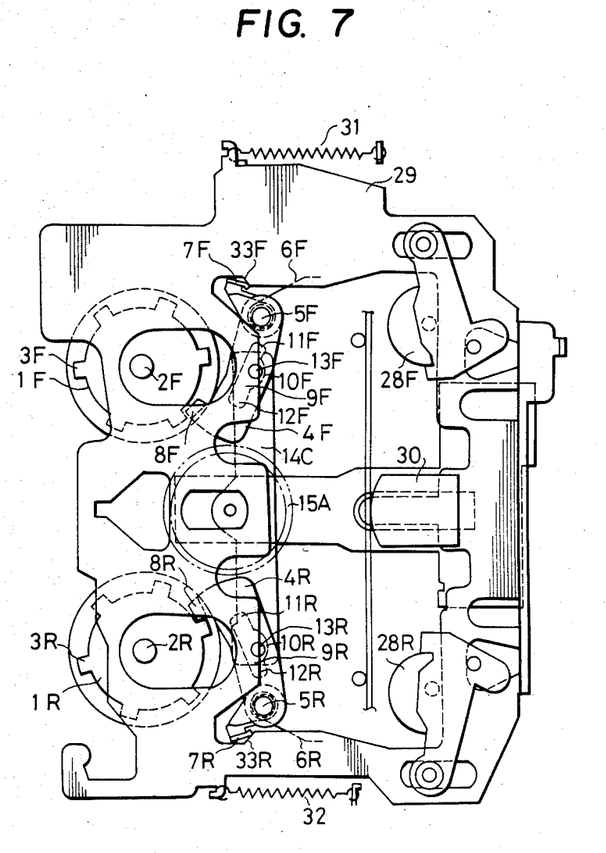
FIG. 7 is a plan view of the braking mechanism shown in FIG. 5, wherein reel bases are braked on the way from the fast-forwarding or rewinding mode to the play mode.

Referring now to FIG. 7, an explanation will be made as to how the mechanism functions upon cancellation of the fast-forwarding or rewinding mode effected by operation of a play mode lever or tape end detection.

When the FF operation lever 17F returns to its non-actuated position (forward of the tape player), the step 21a pushes the pin 23F and moves the oval link 22D, interlock plate 25C and idler gear plate 26G to their play positions with the spring forces 18S and 19S. Responsively, the high revolution gear 15A is moved away from the reel base 1F and the brake control plate 14B is moved frontward of the tape player. So, the push pins 13F and 13R of the brake control plate 14B enter in the cavities 10F and 10R of the elongated holes 9F and 9R and release the pressure to the braking members 4F and 4R so as to allow the springs 6F and 6R to rotate the braking members 4F and 4R to the position where the engagement members 8F and 8R engage and brake the reel bases.

Similarly, when the REW operation lever 16R returns from the actuated (rear) position to the non-actuated (front) position, the brake control plate 14B is moved from its foremost most position to the neutral position where the push pins 13F and 13R enter in the cavities 10F and 10R. So, the braking members 4F and 4R is rotated by the springs 6F and 6R so that the engagement members 8F and 8R engage and brake the reel bases 1F and 1R.

It should be noted that the tapered cams 33F and 33R do not prevent the rotations of the braking members 4F and 4R to the reel bases 1F and 1R because the control plate 29 just started its movement to the left and does not yet reach the position where the tapered cams 33F and 33R can push the pressure-receiving portions 7F and 7R of the braking members.

When the head plate 29h is driven by the motor to the left, the control plate 29 responsively moves to the left against the spring forces 31 and 32 and reaches the position where the tapered cams 33F and 33R push the pressure-receiving portions 7F and 7R of the braking members 4F and 4R against the spring forces 6F and 6R so as to rotate the braking members 4F and 4R to the left and withdraw the engagement members 8F and 8R away from the reel bases 1F and 1R. When the control plate 29 fully moves to the left, the reel bases 1F and 1R are completely released from the braking members 4F and 4R and are driven by the low revolution (play mode) idler gear.

Due to said interconnection between the various members, the reel bases 1F and 1R are never left free for uncontrolled rotation but are prevented by the engagement members 8F and 8R during the time from the detachment of the high revolution gear 15A to the engagement of the low revolution idler gear.

Figure 8:
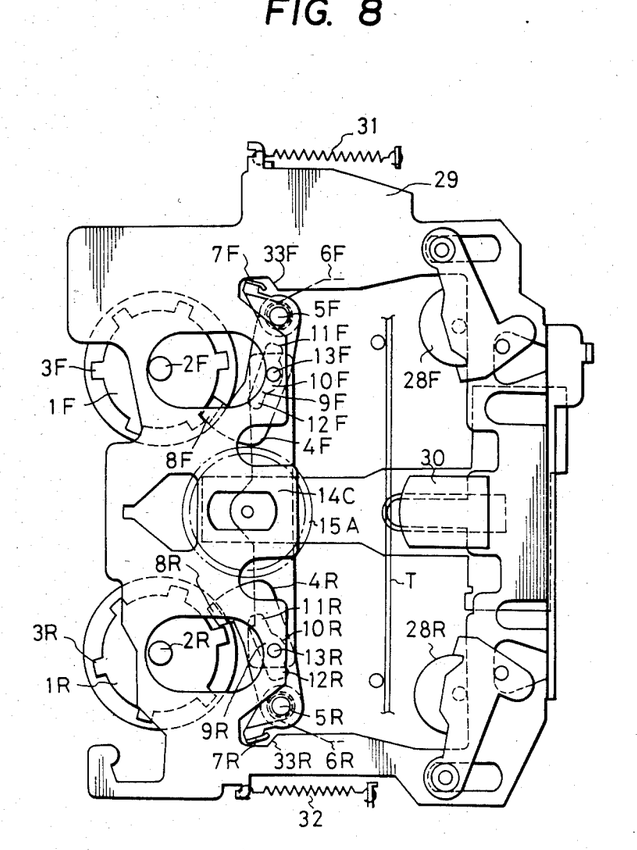
FIG. 8 is a plan view of the braking mechanism shown in FIG. 5, illustrating the rest or eject mode.

Referring to FIG. 8, an explanation will be made hereunder as to how the mechanism functions for and in the rest or eject mode.

When a stop or eject lever is pushed in, the electromagnetic plunger is deenergized and allows the springs 31 and 32 to pull the control plate 29 together with the head plate 29h to the right where the head 30 fully retreats from the tape T. Concurrently, the tapered cams 33F and 33R move to the right where they cannot push the pressure-receiving portions 7F and 7R of the braking members 4F and 4R. So, the braking members 4F and 3R rotate to the reel bases 1F and 1R due to the spring forces 6F and 6R, and the engagement members 8F and 8R engage the reel bases. It should be noted that the braking actions (rotation to the reel bases) of the braking members 4F and 4R are not prevented by the brake control plate 14B at this time because neither the FF lever 17F nor the REW lever 16R is pushed in, the oval link 22D, interlock plate 25C and idler gear plate 26G are disposed in the same positions as in the play mode, and the push pins 13F and 13R of the brake control plate 14B are positioned in the cavities 10F and 10R of the enlongated holes 9F and 9R.

Individual interrelations between the various members may be modified. For example, as the control plate 29 in the Figure, it is possible to use the head plate or a plate carrying both the head and the pinch rollers thereon. To shift the control plate 29, the motor power or a manual force may be used instead of the springs. It is also possible to shift the control plate 29 not by the motor power but by a mechanical construction using a cam, for example, responsive to and with a time lag with insertion or withdrawal of the FF or REW levers. The brake control plate 14B may be directly linked to the FF and REW lever 17F and 16R without interposing the oval link 22D and the interlock plate 25C. The braking members 4F and 4R may be designed to move to and away from the reel bases 1F and 1R by a straight movement instead of the rotation.

As described above, the invention produces various advantages. First, the mechanism never causes that both the high revolution gear and the low revolution gear concurrently engage the reel bases because changeover operation between the play mode idler gear and the FF/REW mode gear respectively to movement of the control plate. Further, owing to the above-mentioned functions of the control plate 29 and the FF and REW levers 17F and 16R, non-braking state is reliably maintained when one of the levers is at the actuated position, thereby eliminating a possibility that the reel bases are braked in the play mode, and also eliminating the phenomenun that the reel bases are left for uncontrolled rotation between cancellation of the fast-forwarding or rewinding mode and revival of the play mode.

The embodiments of the invention in which an exlusive property or privilege is claimed are defined as follows:

1. A tape player which comprises:
a fast-forwarding operation lever;
a rewinding operation lever;
a pair of reel bases;
a pair of flywheels for driving capstans;
a control plate movable responsively to actuation of any one of said operation levers;
a play mode idler gear;
an idler gear plate carrying thereon said play mode idler gear and rotatable from a position where said play mode idler gear engages one of said reel bases to another position where said idler gear engages the other of said reel bases;
a fast-forwarding and rewinding mode idler gear;
a changeover lever carrying thereon said fast-forwarding and rewinding mode idler gear and rotatable from a position where said idler gear engages one of said reel bases to another position where said idler gear engages the other of said reel bases; and
an interlock means interlocking said changeover lever with said idler gear plate and responsive to a position of said control plate to keep said idler gear plate or said changeover lever at a neutral position where said idler gear thereon is disposed away from said reel bases.

2. A tape player as set forth in claim 1 wherein said interlock means consists of first pin formed on one of said control plate and said idler gear plate, first cam hole formed in the other of said control plate and said idler gear plate and receiving therein said first pin, second pin formed on one of said control plate and said changeover lever and second cam hole formed in the other of said control plate and said changeover lever and receiving said second pin therein, said individual cam holes including a narrow portion located at the center thereof for fittingly receiving said associated pin therein, said two pairs of pin and cam hole being adapted so that in response to a position of said control plate, one of said first and second pins enters in said narrow portion of the associated cam hole.

3. A tape player as set forth in claim 1 or 2 further including a pair of braking members for braking said reel bases and a brake control plate responsive to actuation of said fast-forwarding or rewinding operation lever to release said braking action of said braking members, said control plate being shifted to a play position responsively to cancellation of said fast-forwarding or rewinding operation lever and there applying a brake-releasing force to said brake members.

4. A tape player as set forth in claim 3 wherein said braking members are biased to said reel bases by springs connected thereto, said control plate being formed with tapered cams for pushing said braking members against said spring forces to apply said brake-releasing force.

5. A tape player as set forth in claim 4 wherein said each braking member is formed with an elongated hole including a cavity and tapered cams extending from said cavity in the opposite directions, said brake control plate having pins engaging said elongated holes, respectively, said each pin being placed at one of said cams in the associated elongated hole in the fast-forwarding or rewinding operation lever is actuated and pushing the associated braking member in the direction opposite to the biasing direction of said spring to withdraw the braking member from the reel base.

* * * * *